United States Patent
Matsuzaki

(10) Patent No.: US 8,393,425 B2
(45) Date of Patent: Mar. 12, 2013

(54) RESIN MOLDED ARTICLE

(75) Inventor: Tsutomu Matsuzaki, Sano (JP)

(73) Assignee: Calsonic Kansei Corporation, Saitama-shi (JP)

( * ) Notice: Subject to any disclaimer, the term of this patent is extended or adjusted under 35 U.S.C. 154(b) by 357 days.

(21) Appl. No.: 12/442,487

(22) PCT Filed: Dec. 12, 2007

(86) PCT No.: PCT/JP2007/073946
§ 371 (c)(1),
(2), (4) Date: Mar. 23, 2009

(87) PCT Pub. No.: WO2008/081692
PCT Pub. Date: Jul. 10, 2008

(65) Prior Publication Data
US 2010/0038929 A1   Feb. 18, 2010

(30) Foreign Application Priority Data
Dec. 28, 2006  (JP) ................................ 2006-354888

(51) Int. Cl.
*B60K 11/04* (2006.01)
(52) U.S. Cl. ..................................... 180/68.4
(58) Field of Classification Search .............. 180/68.4, 180/68.6; 428/220, 293.4, 297.4; 524/496, 524/445, 101, 191; 526/351, 79, 86, 170
See application file for complete search history.

(56) References Cited

U.S. PATENT DOCUMENTS

| | | | |
|---|---|---|---|
| 5,841,412 A * | 11/1998 | Ebihara | 345/58 |
| 6,251,997 B1 * | 6/2001 | Imai et al. | 525/191 |
| 6,320,009 B1 * | 11/2001 | Nakano et al. | 526/351 |
| 7,060,780 B2 * | 6/2006 | Miyamoto et al. | 524/101 |
| 7,098,263 B2 * | 8/2006 | Mitsunaga et al. | 524/445 |
| 7,553,899 B2 * | 6/2009 | Mawatari et al. | 524/445 |
| 7,754,323 B2 * | 7/2010 | Murai et al. | 428/297.4 |
| 7,847,040 B2 * | 12/2010 | Mori et al. | 526/170 |
| 2001/0036559 A1 | 11/2001 | Haack et al. | |
| 2002/0084122 A1 | 7/2002 | Emori et al. | |
| 2004/0204528 A1 * | 10/2004 | Saito et al. | 524/445 |
| 2006/0000590 A1 * | 1/2006 | Aisenbrey | 165/180 |
| 2008/0206538 A1 * | 8/2008 | Katayama et al. | 428/220 |
| 2008/0242793 A1 * | 10/2008 | Yano | 524/496 |
| 2010/0206459 A1 * | 8/2010 | Miyamoto et al. | 156/73.6 |

FOREIGN PATENT DOCUMENTS

| | | |
|---|---|---|
| JP | 1-241406 A | 9/1989 |
| JP | 11-180342 A | 7/1999 |
| JP | 2001-200167 A | 7/2001 |
| JP | 2001-219437 A | 8/2001 |
| JP | 2002-173051 A | 6/2002 |
| JP | 2003-285323 A | 10/2003 |
| JP | 2006-151313 A | 6/2006 |
| JP | 2006-305994 A | 11/2006 |

* cited by examiner

*Primary Examiner* — Hau Phan
(74) *Attorney, Agent, or Firm* — Foley & Lardner LLP

(57) ABSTRACT

In a large-sized radiator core support manufactured by filling a mold cavity 2 with a resin material through injection, polypropylene (PP) containing carbon fiber in a range of 15 to 30 wt % is used as the resin material, and an average fiber length of the carbon fiber remaining after molding is set to 1.5 mm or more. Moreover, a spiral flow length L/D of the carbon fiber is set to 200 mm or more.

2 Claims, 4 Drawing Sheets

RESIN MOLDED ARTICLE

TECHNICAL FIELD

The present invention relates to a resin molded article, for example.

BACKGROUND ART

Modular automotive components have been actively developed in recent years in response to the needs for reduction in the number of components and reduction in weight. Particularly, for front modules, lightweight materials such as resin and magnesium are often employed in place of conventional steel materials.

Examples of such lightweight materials include lightweight metals such as aluminum and magnesium; and composite materials made by combining engineering plastic materials such as Nylon (registered trademark) and glass or carbon fiber in particular.

For example, a Japanese Patent Brochure, Patent Application Laid-Open No. 2001-219437 (Patent Document 1) introduces application of a Nylon material containing glass fiber or carbon fiber to a front end module.

Meanwhile, another Japanese Patent Brochure, Patent Application Laid-Open No. Hei-11-180342 (Patent Document 2) discloses a method of manufacturing a front end panel using a resin material containing a long fiber material.

However, in the technique described in the above-described Patent Document 1, the resin material is limited to Nylon. Nylon has a higher specific gravity than polypropylene (PP) and has a disadvantage that its property inevitably degrades due to water absorption.

Meanwhile, the technique described in the above-described Patent Document 2 has no disclosure concerning carbon fiber but only has disclosure of polypropylene combined with long glass fiber. The glass fiber can hardly contribute to reduction in weight of a radiator core.

The present invention has been made to solve the above-mentioned problems. An object of the present invention is to provide a resin molded article which is capable of achieving considerable reduction in weight and being integrally manufactured by means of injection molding.

DISCLOSURE OF THE INVENTION

To achieve the above object, a first aspect of the present invention provides a resin molded article manufactured by filling a mold cavity (2) with a resin material through injection, in which the resin material is polypropylene (PP) containing carbon fiber in a range of 15 to 30 wt %, and an average fiber length of the carbon fiber remaining after molding is 1.5 mm or more.

According to the resin molded article based on the first aspect of the present invention, the resin material is defined as polypropylene (PP) containing the carbon fiber in the range from 15 to 30 wt %, and the average fiber length of the carbon fiber remaining after molding is 1.5 mm or more. Therefore, the resin molded article is high in strength, and rigidity, and low in specific gravity, thereby achieving lighter weight of the article.

A second aspect dependent on the first aspect of the present invention provides the resin molded article, in which a spiral flow length L/D of the carbon fiber is 200 mm or more where L is a reached spiral flow channel length and D is a spiral flow channel depth.

According to the second aspect of the present invention, the spiral flow length (L/D) of the carbon fiber is defined as L/D and is 200 mm or more. Therefore, the resin fluidity becomes equivalent to that of polypropylene having reinforcing glass fiber content of 40%. Accordingly, it is possible to manufacture the resin molded article integrally by injection molding under the molding conditions which is substantially the same to conventional molding condition.

In a third aspect dependent on either the first aspect or the second aspect of the present invention, the resin molded article is a large-sized radiator core support (3).

According to the resin molded article based on the third aspect of the present invention, the resin molded article is high in strength and rigidity, and low in specific gravity and weight. Therefore, it is possible to obtain sufficient strength as a large-sized radiator core support while avoiding a substantial weight increase.

BEST MODE FOR CARRYING OUT THE INVENTION

Now, the best mode for applying the present invention will be specifically described below in detail with reference to the drawings.

Figure 1:
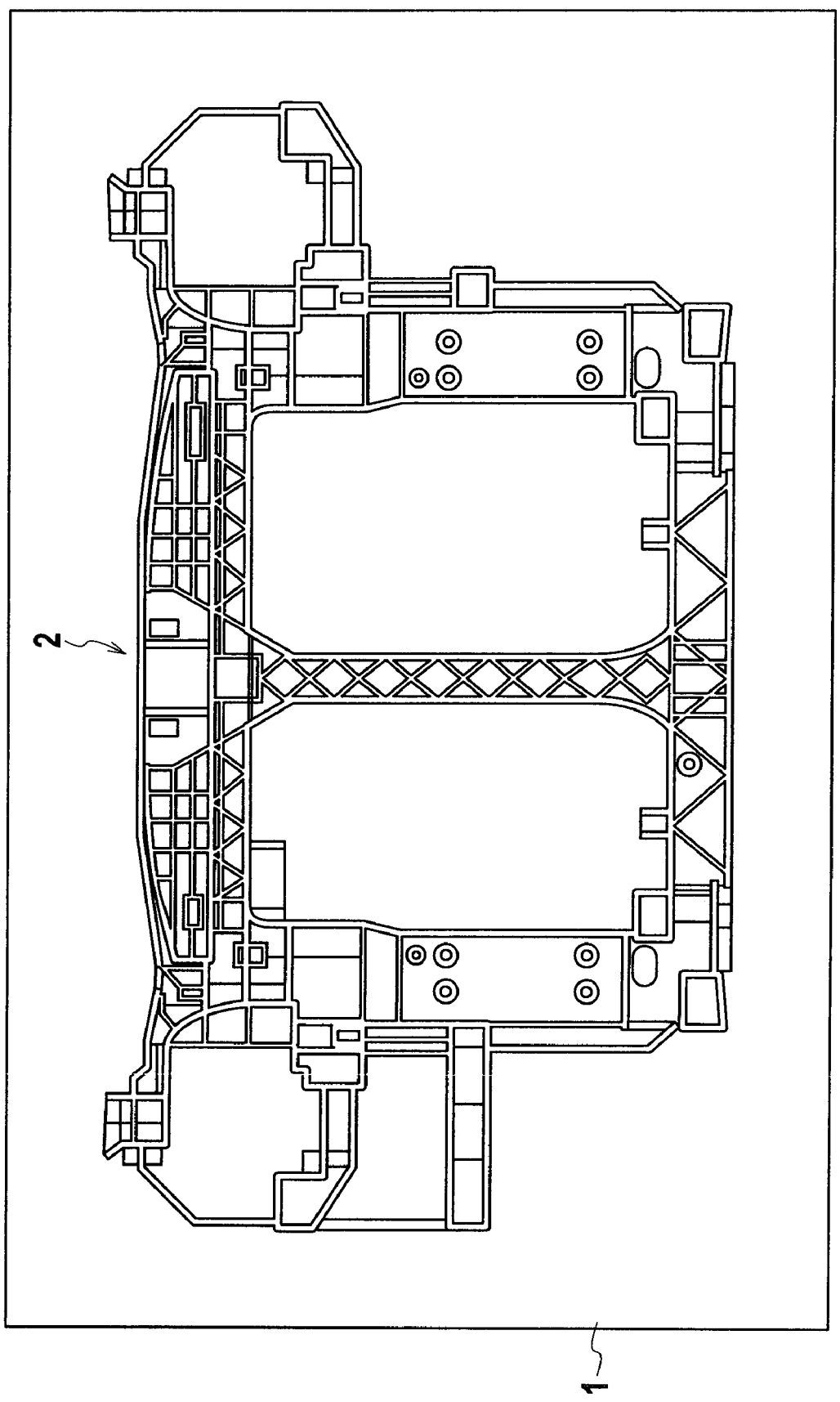
FIG. 1 is a plan view of a mold cavity for molding a large-sized radiator core support.
Figure 2:
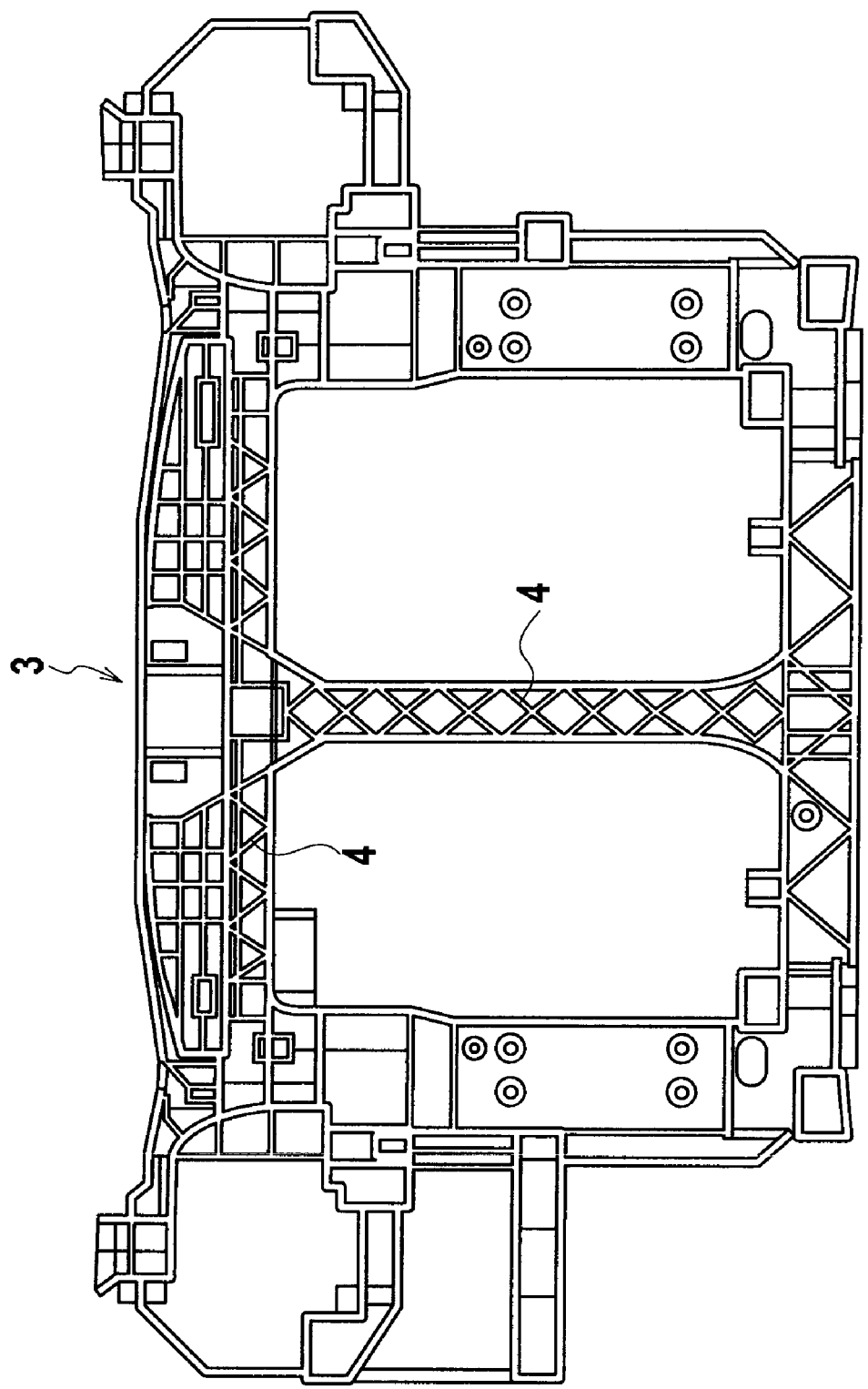
FIG. 2 is a front view of a molded large-sized radiator core support.
Figure 3:
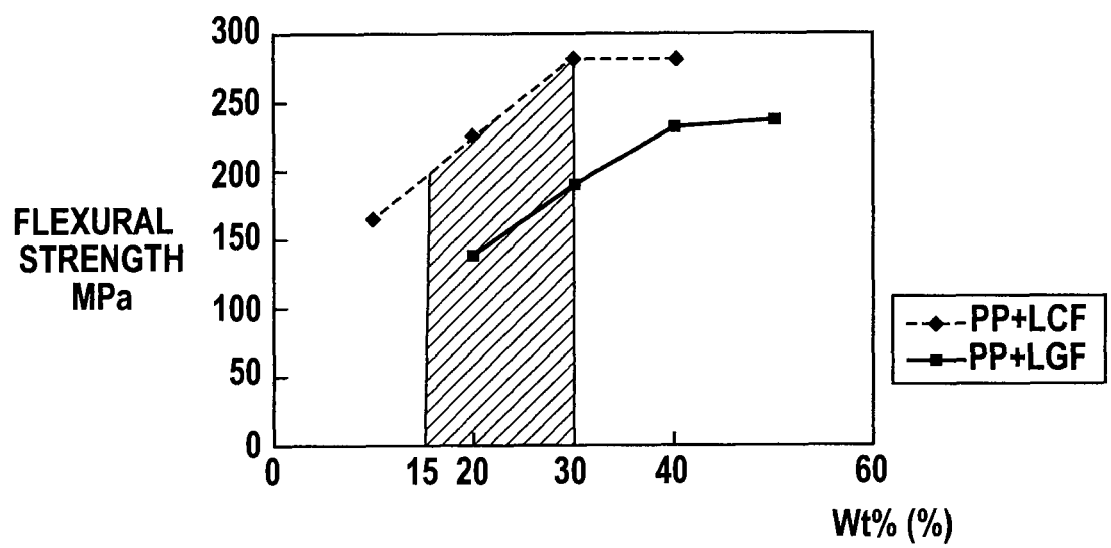
FIG. 3 is a characteristic chart showing an effect of an amount of added fiber relative to flexural strength.
Figure 4:
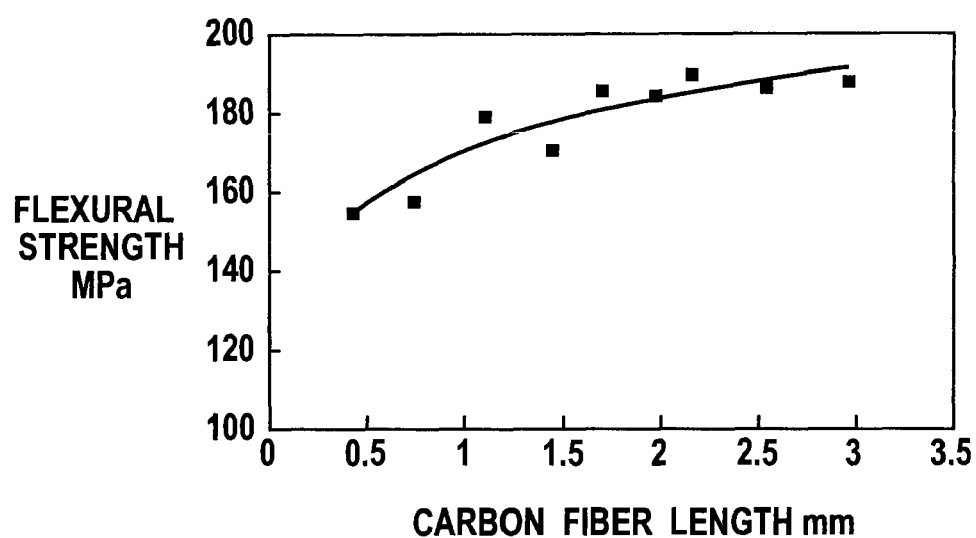
FIG. 4 is a characteristic chart showing a relation between the flexural strength and a carbon fiber length.
Figure 5:
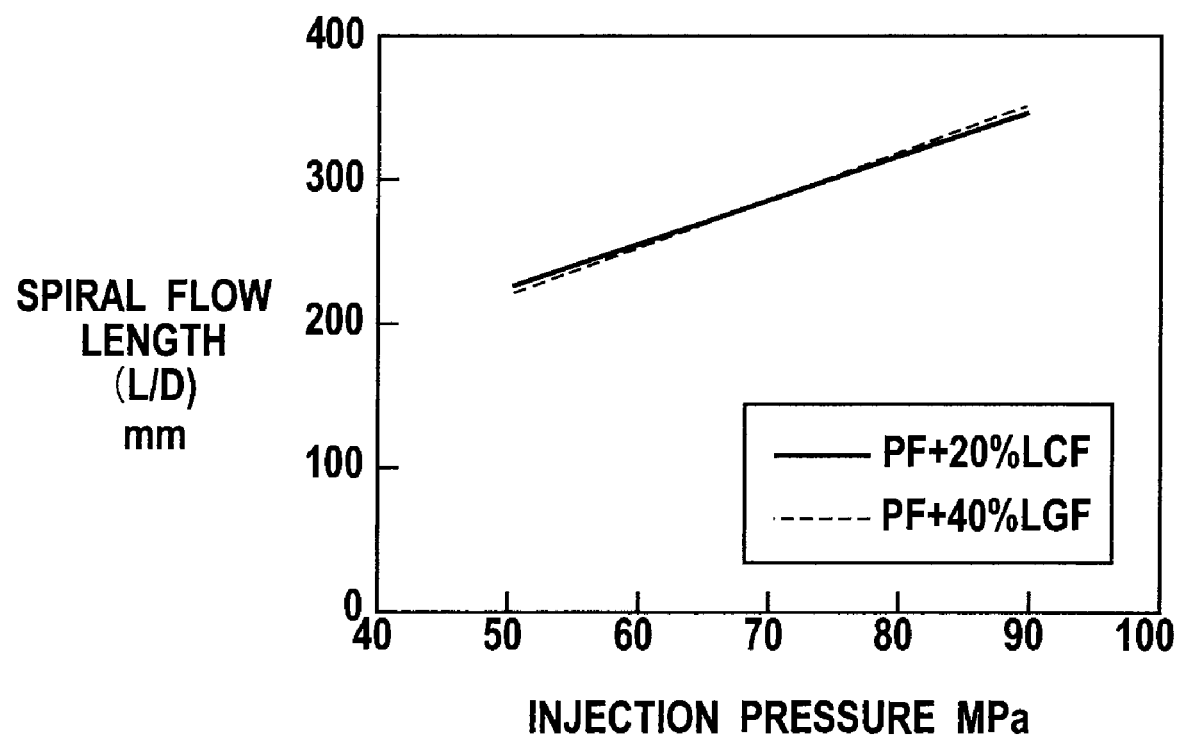
FIG. 5 is a characteristic chart showing a relation between a spiral flow length and injection pressure.

FIG. 1 is a plan view of a mold cavity for molding a large-sized radiator core support, FIG. 2 is a front view of a molded large-sized radiator core support, FIG. 3 is a characteristic chart showing an influence of an amount of added fiber relative to flexural strength, FIG. 4 is a characteristic chart showing a relation between the flexural strength and a carbon fiber length, and FIG. 5 is a characteristic chart showing a relation between a spiral flow length and injection pressure.

As shown in FIG. 1, a large-sized radiator core support as a resin molded article of this embodiment is manufactured by; filling a mold cavity 2 with a resin material through injection; then cooling the resin material at a room temperature for a predetermined time period; and then taking the molded article out of the mold cavity 2.

A large-sized radiator core support 3 is required to achieve light weight in order to improve mileage of an automobile. Accordingly, a carbon fiber reinforced resin material being lighter than glass fiber and having high strength and high rigidity characteristics is used in this embodiment to integrally mold the large-sized radiator support. Here the large-sized radiator support is molded by a completely novel method of injection molding applying carbon fiber which has never been carried out in the past.

In this embodiment, polypropylene (PP) containing carbon fiber is used as the resin material to be injected and filled in the mold cavity 2. The content of the carbon fiber is set in a range from 15 to 30 wt %. There is a relation as illustrated in the characteristic chart in FIG. 3 between an amount of added carbon fiber and flexural strength. By an equivalent amount of addition, polypropylene containing the carbon fiber (PP+LCF) can achieve a higher flexural strength as compared to polypropylene containing glass fiber (PP+LGF) that has been conventionally used in order to enhance the flexural strength.

For example, polypropylene having carbon fiber content of 20% has the flexural strength equivalent to polypropylene having glass fiber content of 40%. Moreover, there is an advantage of using the carbon fiber in light of a material cost because half as much as carbon fiber compared to glass fiber is enough to obtain sufficient effect. Considering both of aspects of the flexural strength and the material cost, the carbon fiber content is preferably set in the range from 15 to 30 wt %. If the carbon fiber content relative to polypropylene is below 15 wt %, it is not possible to ensure sufficient flexural strength. On the other hand, if the content exceeds 30 wt %, the sufficient flexural strength is ensured but the material cost becomes expensive.

Meanwhile, concerning an average fiber length of the carbon fiber, it is preferable to set the average fiber length of fiber existing after injection molding to 1.5 mm or more. A relation between the flexural strength and the carbon fiber length is shown in the characteristic chart of FIG. 4. Here, the flexural strength increases as the remaining fiber length becomes longer. To obtain a fine physical property of a long fiber reinforced composite material, it is important to secure long fiber lengths in the article. In order to ensure the sufficient flexural strength as the large-sized radiator core support, it is desirable to set the average fiber length remaining after molding to 1.5 mm or more.

Meanwhile, concerning resin fluidity of polypropylene containing the carbon fiber, it is preferable to set spiral flow length L/D of the carbon fiber to 200 mm or more. As shown in the characteristic chart in FIG. 5, the resin fluidity of polypropylene containing 20 wt % of carbon fiber (PP+20% LCF) is equivalent to that of polypropylene containing 40 wt % of glass fiber (PP+40% LGF). Therefore, when molding the large-sized radiator core support by using polypropylene containing 20 wt % of carbon fiber, it is possible to perform injection molding under molding conditions that are substantially equivalent to the conventional molding conditions for polypropylene containing glass fiber.

The spiral flow length represents a length reached by the flow of the resin in a spiral flow channel when the resin is injected at constant injection temperature and injection pressure from a central gate of a mold in which the spiral flow channel is formed.

The L/D value is expressed by (reached spiral flow channel length L)/(spiral flow channel depth D). This L/D value is affected by the injecting conditions (the injection temperature and the injection pressure), and the L/D value 200 mm or more is achieved when the injection temperature is equal to 250° C. and the injection pressure is equal to 50 MPa.

As described above, by using polypropylene containing the carbon fiber in the range from 15 to 30 wt % as the resin material, by setting the average fiber length of the carbon fiber remaining after molding is set to 1.5 mm or more, and by setting the spiral flow length L/D of the carbon fiber to 200 mm or more, the carbon fiber smoothly flow throughout the inside of the mold cavity 2 when the injection molding is performed for the mold cavity 2. Accordingly, it is possible to mold the large-sized radiator core support 3 integrally by injection molding.

The large-sized radiator core support 3 thus molded has high strength, high rigidity, and low specific gravity, and it is possible to achieve considerable reduction in the weight of the article as compared to the case of molding by use of the resin material containing glass fiber. Moreover, in this large-sized radiator core support 3, it is preferable to set its plate thickness in a range from 2 to 3 mm in order to secure the sufficient strength and rigidity. Additionally, it is preferable to form protrusions such as ribs 4 in regions where stress is applied. As shown in FIG. 2, the ribs 4 are provided at a central portion and an upper bead portion of the large-sized radiator core support 3, for example.

The present invention is not limited only to such foregoing description and the above-described embodiment of the present invention, but can be embodied in various other aspects by applying appropriate modifications.

It is to be noted that the entire contents of Japanese Patent Application No. 2006-354888 (filed on Dec. 28, 2006) are incorporated in this specification by reference.

The invention claimed is:

1. A resin molded article manufactured by filling a mold cavity (2) with a resin material through injection, wherein the resin material is polypropylene (PP) containing carbon fiber in a range of 15 to 30 wt %, and an average fiber length of the carbon fiber remaining after molding is 1.5 mm or more, and
wherein a spiral flow length L/D of the carbon fiber is 200 mm or more, where L is a reached spiral flow channel length and D is a spiral flow channel depth, when the injection temperature is equal to 250° C. and the injection pressure is equal to or more than 50 MPa.

2. The resin molded article according to claim 1, wherein the resin molded article is a large-sized radiator core support (3).

* * * * *